Nov. 14, 1961  H. F. JENSEN  3,008,161
EYEGLASS CLEANER
Filed April 9, 1959
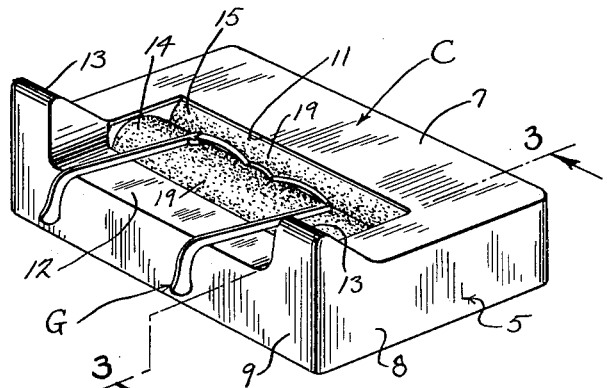
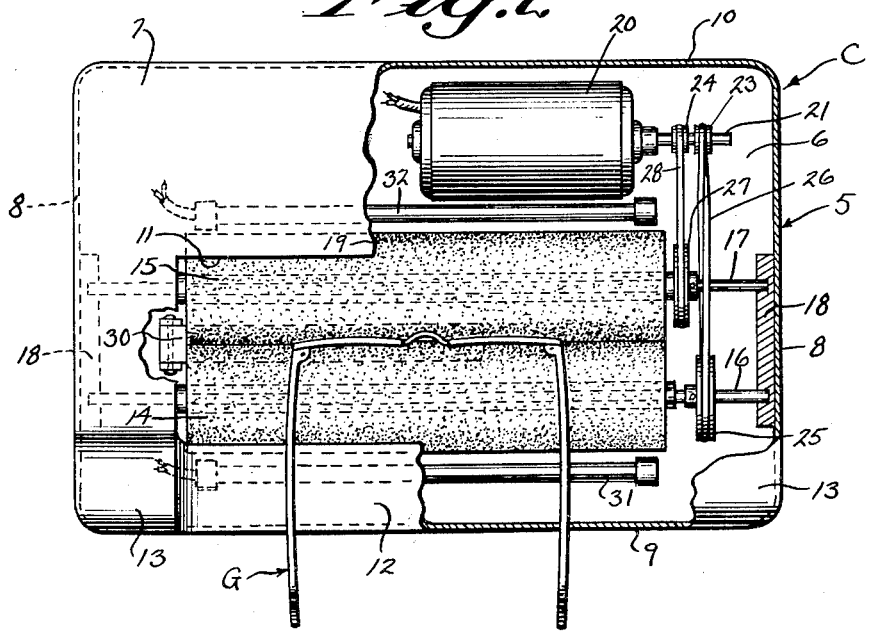
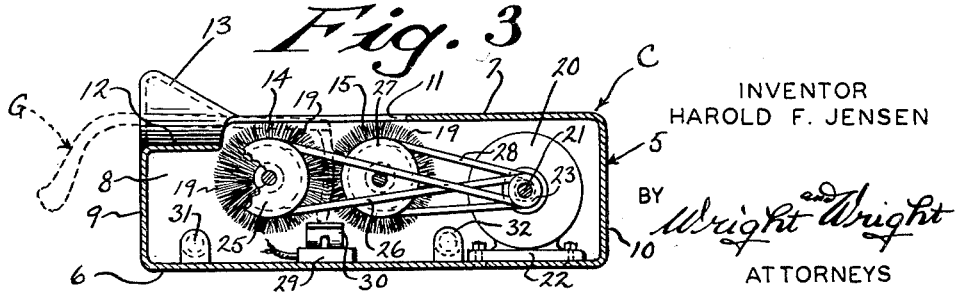
INVENTOR
HAROLD F. JENSEN
BY *Wright and Wright*
ATTORNEYS

United States Patent Office 3,008,161
Patented Nov. 14, 1961

3,008,161
EYEGLASS CLEANER
Harold F. Jensen, 2040 W. Wisconsin Ave., Milwaukee, Wis.
Filed Apr. 9, 1959, Ser. No. 805,328
1 Claim. (Cl. 15—21)

This invention appertains to a device for facilitating the efficient cleaning of the lenses of eyeglasses and more particularly to an eyeglass cleaning cabinet in which the insertion of the lenses and their frames in the cabinet will automatically bring about the desired cleaning and polishing operation.

In industrial plants, where the wearing of safety glasses is a rule, great difficulty is experienced in keeping eyeglasses clean. Silicone treated polishing paper is furnished by the plants for use by the personnel, however, great quantities of this paper are used and much time is expended in the eyeglass cleaning operation.

It is therefore one of the primary objects of my invention to provide a cabinet, which will occupy a minimum amount of space and which can be placed either in a vertical or horizontal plane and at a desired convenient point, having a pair of power driven soft tuft brushes, with means for guiding and inserting the lenses of the eyeglasses between the brushes, whereby the opposite faces of the lenses will be simultaneously and quickly cleaned.

Another salient object of my invention is to provide power driven soft tuft brushes treated with silicone for polishing and coating the lenses as well as the cleaning thereof.

A further important object of my invention is the provision of ultraviolet ray lamps advantageously placed in the cabinet for killing any germs on the brushes and glasses.

With these and other objects in view, the invention consists in the novel construction, arrangement and formation of parts as will hereinafter be more specifically described, claimed and illustrated in the accompanying drawing, in which drawing:

FIGURE 1 is a perspective view of my eye-glass cleaning cabinet showing a pair of eyeglasses inserted therein for the cleaning operation;

FIGURE 2 is a top plan view of the eyeglass cleaning cabinet with a pair of eyeglasses inserted therein, parts of the view being shown being broken away and in section to illustrate structural detail, the view being taken on a larger scale than FIGURE 1; and FIGURE 3 is a transverse sectional view through the cleaning cabinet, taken on the line 3—3 of FIGURE 1 and looking in the direction of the arrows.

Referring to the drawings in detail, wherein similar reference characters designate corresponding parts throughout the several views, the letter C generally indicates my novel eyeglass cleaning cabinet and the same includes a casing or housing 5. This casing or housing 5 can be formed from any desired material such as sheet metal stamped into the desired form or from a molded plastic material. The cabinet includes a flat bottom wall 6, an outer or top wall 7, end walls 8 and front and rear walls 9 and 10. The top wall 7 is provided with an elongated longitudinally extending opening 11 through which the eyeglasses are inserted during the cleaning operation, as will be later set forth. It is preferred to lower the height of the front of the cabinet as indicated by the reference character 12, for a purpose which will also be later set forth. At each end of the lowered portion of the cabinet and at each end of the opening 11 is formed outstanding guide projections or bosses 13 and these projections or bosses limit the sideways movement of a pair of eyeglasses when the lens part thereof is inserted in the opening 11.

Rotatably mounted within the cabinet 5 is a pair of horizontally disposed longitudinally extending brushes 14 and 15. The brushes 14 and 15 are mounted respectively on shafts 16 and 17 and the terminals of these shafts rotatably supported in bearing blocks 18 carried by the end walls 8 of the cabinet. The brushes are provided with soft tufts or bristles 19 and these tufts or bristles are silicone treated so as to bring about the desired polishing, cleaning and coating of the lenses of the eyeglasses. The brushes are arranged in facial relation and during the cleaning operation, the lens part of the glasses is inserted between the brushes. The brushes are located in the cabinet directly inward of the opening 11 and due to the front lower portion 12 of the cabinet the outer faces of the brushes are exposed to view and this facilitates the movement of the eyeglasses between the brushes.

Also mounted within the cabinet is a small electric motor 20 and this motor has its armatured shaft 21 disposed in parallel relation to the brush shafts 16 and 17. The base 22 of the motor can be bolted or otherwise fastened to the inner or bottom wall 6 of the cabinet, as best shown in FIGURE 3. The armature shaft 21 has keyed or otherwise secured thereto two spaced pulley wheels 23 and 24. The brush shaft 16 has keyed thereto a pulley wheel 25 and the pulley wheels 23 and 25 are operatively connected by a pulley belt 26. The brush shaft 17 has keyed or otherwise secured thereto a pulley wheel 27 and the pulley wheels 24 and 27 are operatively connected together by a pulley belt 28. One of the pulley belts is crossed, so that the brush shafts 16 and 17 are rotated in opposite directions and toward one another. The electric motor 20 can be supplied with electric current from a conventional electric circuit or dry cell batteries can be housed within the cabinet for supplying current to the motor.

Now referring to the operation of the device, when it is desired to clean a pair of eyeglasses, the same being indicated by the reference character G in the drawings, the bows of the eyeglasses are laid on the front lower portion 12 of the outer or top walls 7 and the lens parts and their frames are swung into the cabinet between the brushes 14 and 15. The brushes are then operated to simultaneously wipe the opposite faces of the lenses and thus bring about the quick, efficient cleaning and polishing thereof. Again, the projections or bosses 13 prevent the lateral shifting of the eyeglasses G beyond a certain point.

It is preferred to control the opening and closing of a circuit through the motor 20 by the insertion and removal of the eyeglasses G between the brushes. Hence, I provide a microswitch (pressure sensitive) 29 in the cabinet. This switch can be secured to the inner or bottom wall 6 of the cabinet and the switch is disposed directly between the brushes 14 and 15 and in the path of the movement of the eyeglasses during their insertion between the brushes. This microswitch 29 is provided with a pivoted operating lever 30 and this lever normally extends outward toward and between the brushes. It therefore can be seen (see FIGURE 3) that when the glasses are inserted between the brushes the same will strike the pivoted lever 30 and operate the microswitch.

Arranged within the cabinet and supported by the inner or bottom wall 6 thereof are elongated ultraviolet tube lamps 31 and 32. These lamps are arranged on the opposite sides of the brushes and these lamps function to kill any germs on the brushes or the eyeglasses.

The cabinet can be placed at a desired point in a manufacturing plant and obviously the same can be laid on a horizontal surface, such as a table, or suspended in a vertical position from a wall or to a support.

Various changes in details may be made without departing from the spirit or the scope of this invention but what I claim as new is:

An eyeglass cleaning and polishing machine comprising a cabinet including top and bottom walls, side and end walls, the top wall having a longitudinally extending eyeglass receiving opening, a pair of parallel longitudinally extending soft tufted brushes rotatably mounted in the cabinet directly inward of said opening and extending the full length thereof and parallel therewith and exposed to view through the opening, the tufts of the brushes being in facial relation, means for driving the brushes in opposite directions, and said top wall having a flat depressed portion leading to said opening and disposed below the outer faces of the brushes and defining a wide flat rest for the bows of a pair of eyeglasses to facilitate the movement of the lens part of the eyeglasses through the opening and between the brushes, and guide and stop means at the opposite ends of the rest for limiting sidewise movement of the bows of the eyeglasses longitudinally of the rest.

References Cited in the file of this patent

UNITED STATES PATENTS

| | | |
|---|---|---|
| 1,503,719 | Stelter | Aug. 5, 1924 |
| 2,036,840 | Thiesen | Apr. 7, 1936 |
| 2,274,309 | Velton | Feb. 24, 1942 |
| 2,681,467 | Guyer | June 22, 1954 |
| 2,704,374 | Barklow | Mar. 22, 1955 |
| 2,864,103 | Gerber | Dec. 16, 1958 |

FOREIGN PATENTS

| | | |
|---|---|---|
| 806,980 | Great Britain | Jan. 7, 1959 |